United States Patent
Yoshida et al.

(10) Patent No.: US 6,351,371 B1
(45) Date of Patent: Feb. 26, 2002

(54) ELECTRODE FOR ELECTROLYTIC CAPACITOR

(75) Inventors: Tsunenori Yoshida, Yawata; Kenji Hoshino, Kobe; Masakazu Tanahashi, Osaka; Yoshihiro Higuchi, Otsu, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/549,491

(22) Filed: Apr. 14, 2000

(30) Foreign Application Priority Data

Apr. 16, 1999 (JP) .............................. 11-109246

(51) Int. Cl.[7] .......................... H01G 9/04; H01G 9/042
(52) U.S. Cl. ..................... 361/528; 361/529; 361/532; 361/508
(58) Field of Search ................................ 361/523, 524, 361/528, 529, 532

(56) References Cited

U.S. PATENT DOCUMENTS

| | | | | |
|---|---|---|---|---|
| 3,955,126 A | * | 5/1976 | Murakami et al. | 361/527 |
| 4,059,887 A | | 11/1977 | Galvagni | |
| 4,085,435 A | | 4/1978 | Galvagni | |
| 4,090,231 A | * | 5/1978 | Millard et al. | 361/529 |
| 4,945,452 A | | 7/1990 | Sturmer et al. | |
| 5,394,295 A | | 2/1995 | Galvagni et al. | |
| 5,586,001 A | * | 12/1996 | Amano et al. | 361/525 |

FOREIGN PATENT DOCUMENTS

| | | |
|---|---|---|
| JP | 57-138330 | 8/1982 |
| JP | 58-187136 | 12/1983 |
| JP | 59-187129 | 12/1984 |
| JP | 63-283012 | 11/1988 |
| JP | 04-164308 | 6/1992 |
| JP | 10-074668 | 3/1998 |

* cited by examiner

*Primary Examiner*—Anthony Dinkins
(74) *Attorney, Agent, or Firm*—Wenderoth, Lind & Ponack, L.L.P.

(57) ABSTRACT

An anodic electrode for an electrolytic capacitor having high capacitance with low-resistance properties at high frequencies and capable of carrying large current, and a process of producing the same. Such an anodic electrode for electrolytic capacitor includes a porous body having micropores to be formed with a dielectric layer therein and to be filled with electrolyte therein, wherein the porous body includes a laminate of a plurality of sinter layers having the micropores formed from valve metal particles. The laminate includes multilaminarly smaller micropore-size regions and larger micropore-size regions to form electric conductive passages between the small micropore-size regions and side surfaces of the porous body to reduce resistance of the capacitor and also increase capacitance by utilizing the smaller micropores-size regions for capacitor effectively. The porous body is formed by stacking a plurality of porous preforms such as sheets preformed of valve metal powder into a laminate, and then sintering the laminate. The porous body may be joined with a valve metal substrate during sintering, thereby completing the anodic electrode for an electrolytic capacitor. Particularly, the porous body may be a laminate including large micropore-size sinter layers and small micropore size sinter layers, by alternatively laminating two types of preforms different in density.

31 Claims, 8 Drawing Sheets

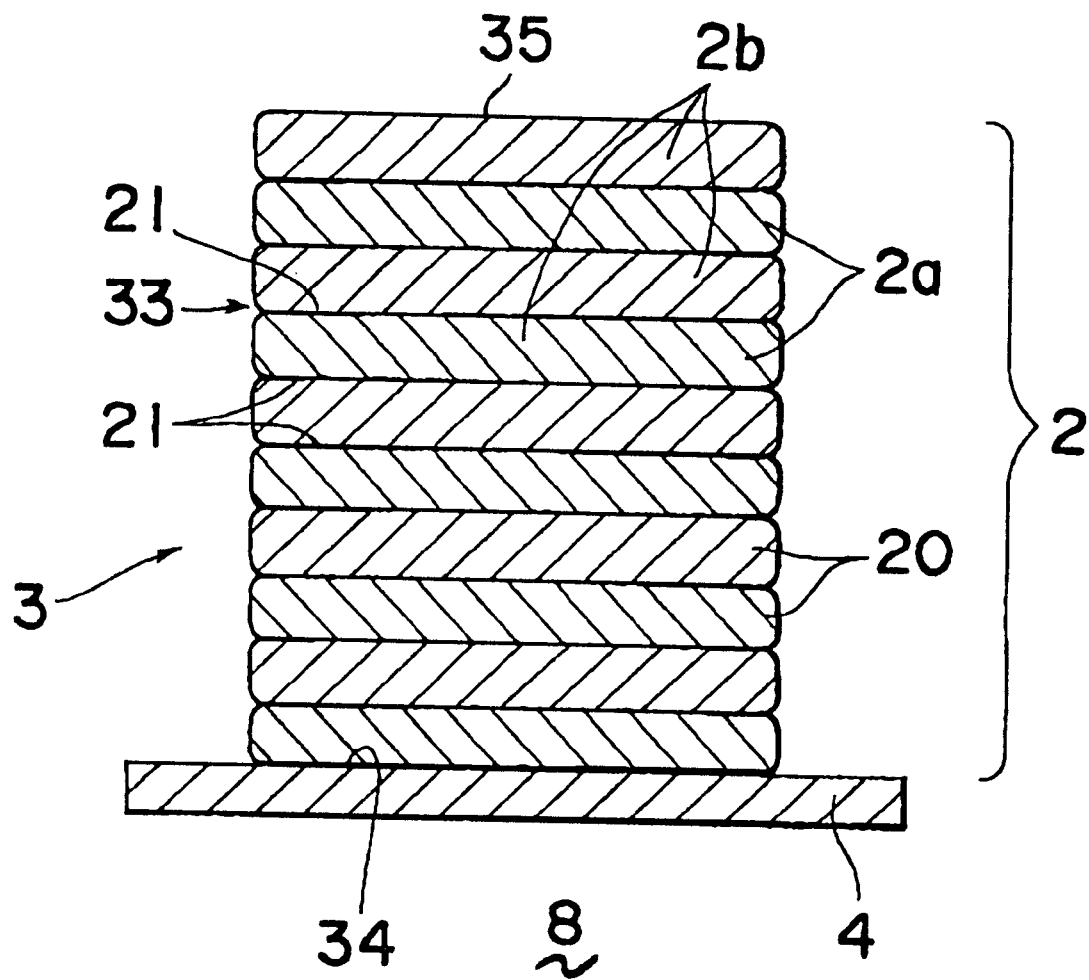

US 6,351,371 B1

ELECTRODE FOR ELECTROLYTIC CAPACITOR

BACKGROUND OF THE INVENTION

1. Field of the Invention

The present invention relates to an electrode for an electrolytic capacitor and a process of producing the electrode.

2. Prior Art

Electrolytic capacitors have historically been increased in capacitance-higher and higher capacitance in smaller and smaller packages. Electrolytic capacitors are often used on the secondary side of a smoothing circuit of a direct power supply to assist the prompt starting operation of a central processing unit used for computers such as personal computers and, such capacitors are, in particular, required to have excellent high-frequency properties of the discharging of a large current to the units.

Various improvements have been made in the electrodes, particularly, anodes to be used in such electrolytic capacitors to meet these requirements. For aluminum electrolytic capacitors, in which an anode is usually formed of aluminum foil subjected to surface area-enlarging treatment by etching, it has been proposed to form finer capillaries in the metal foil by stepping up the etching level. The etched anode metals are anodized to form a dielectric layer on a micropore surface having increased area in the anode metal foil. Thus, the increased surface area of the dielectric layer results in an increased capacitance of the capacitor.

A tantalum capacitor utilizes, as the electrode, a porous body made by sintering fine powder of metal tantalum, which has valve metal function. The porous electrode has micropores in the porous body and can have significantly great specific surface area. By anodizing the metal porous body, the dielectric layer is formed on the inner surface of the micropores, obtaining large surface area. The provision of capacitance on the entire surface of the micropores enables the total capacitance of the capacitor to be increased.

Capacitor electrodes made from fine powder of a metal that has valvular function such as tantalum, aluminum and niobium are disclosed in, for example, Japanese Patent Publication No. 63-283012, Japanese Utility Model Publication Nos. 57-13830, 58-187136, and 59-187129. The capacitor electrodes disclosed in these publications are made by planting a lead wire 41 in a sintered porous body 29 as an anode made from fine powder of a metal that has valvular action, as shown in FIG. 8. In addition, the publications quoted above have proposed that a portion of the porous body in the porous body at which the lead is embedded should be worked thin and flat, that the embedded portion of the lead is limited to some length and that the porous body is limited to a certain degree of flatness of the porous body at the portion where the lead 41 is embedded in the sintered body.

Now a conventional method commonly employed to manufacture a tantalum capacitor will be described below. A block has been compressed from a metal tantalum fine powder having micropores corresponding to a high specific surface area having a grade of about 30000 $\mu$F·V/g of equivalent capacitance per unit weight, in specified dimensions, and is sintered to a porous body for an anode. Then a dielectric layer has been formed on the porous body in a known manner by anodizing. At this time, the micropores of the porous body formed by the dielectric layers are filled with an electrolyte of, for example, manganese dioxide. Then, the tantalum capacitor has been completed by attaching a cathode-connecting electrode to the porous body in a known manner.

In order to provide a capacitor having higher capacitance, a tantalum capacitor of higher capacitance should have been achieved by sintering a metal tantalum having greater specific surface area of the micropores corresponding to an equivalent capacitance of, for example, 50000 $\mu$F·V/g, to form similar dimensions of a block as those described above.

Actually, the tantalum capacitor produced using the fine powder of 50000 $\mu$F·V/g was not produced so high in capacitance as expected from the equivalent capacitance, and high-frequency characteristic of the capacitor was lowered unsatisfactory, thus resulting in an undesirable characteristic for carrying a large current.

Such insufficient capacitance of the electrolytic capacitor of the prior art is considered to be caused primarily by the insufficient filling of the electrolyte in the micropores of the porous body used to make the anode. That is, the electrolyte that substantially performs the function of the anode does not sufficiently reach the dielectric layers of the micropores, and therefore the micropores are not filly utilized to provide capacitance.

A second reason is that, since the porous body h as not been provided with sufficient surface area of the electrolyte as a cathode disposed on the body surface to be jointed and covered with the cathode-connection electrode of a internal contact layer, such as silver-containing conductive resin through a graphite layer in direct contact with the cathode, the contact resistance between the electrolyte and the cathode-connection electrode have been increased. Thus, equivalent series resistance of the total conventional capacitor could not decrease, resulting in a poor high-frequency characteristic.

In order to overcome the above problems, it was necessary to fill the electrolyte into the micropores in the porous body and increase the outer surface area of the valve metal porous body to connect with the cathode-connection electrode, then to make the equivalent series resistance lower.

SUMMARY OF THE INVENTION

An object of the present invention is to provide an anodic electrode for use with an electrolytic capacitor that has a high capacitance and an excellent high-frequency characteristic, while being capable of carrying a large current.

Another object of the present invention is to provide a process of producing the electrode.

In the anodic electrode of the present invention, laminated regions of large size micropores are established in a porous body of a valve metal in order to make electric current passages to reach fine size micropore regions which can exhibit high capacitance. Then, the inner resistance is reduced and the capacitance of the electrode is increased.

Further, in the anodic electrode of the present invention, side surfaces of the porous body are expanded by linear recesses and/or projections, such as grooves or corrugations, formed on the side surfaces of the porous body. Then, the increased area of the outer surface can reduce the contact resistance between the porous body and a cathode-connecting electrode material attached on the outer surface to be connected to a cathode lead.

In this description, an anodic electrode for use with an electrolytic capacitor comprises at least a porous body of a valve metal as an anode of a capacitor, and may include a valve metal substrate for an anode electric collector.

To realize such an anodic electrode in the present invention, the porous body of valve metal may include a laminate of a plurality of sinter layers having micropores. In this case, the laminated regions of larger size micropores are formed in the vicinity of the interfaces between the adjacent sinter layers rather than inside each of the sinter layers. The larger micropore-size regions close to the interfaces, when filled with solid electrolyte, are used for electric current passages to the inner region of the sinter layers thereby reducing inner resistance.

Such a laminate in the porous body may be formed by sintering a laminate composed of a plurality of preforms which are previously formed from a powder of valve metal.

In another aspect of the invention, the larger micropore-size regions and the smaller micropore-size regions may be at least two types of sinter layers different quantitatively in certain properties.

The larger micropore-size region may include sinter layers having large micropores which are made to contact with other sinter layers having smaller micropores. The larger micropore-sized sinter layers and the smaller micropore-sized sinter layers are laminated of preforms having large micropores of a valve metal powder and preforms having small micropores of the same, respectively.

The laminate may include a larger micropore-sized sinter layer as a first type of sinter layer and a smaller micropore-sized sinter layer as a second type of sinter layer. The first and second type sinter layers are laminated in contact with each other such that at least one side of a first type layer makes contact with a side of the other type of sinter layer. The larger micropore-sized sinter layers provided in the porous body may be capable of being filled with solid electrolyte so as to be used for current passages to decrease inner resistance and the smaller micropore size sinter layers which increase the capacitance because of high specific surface area of micropore in the layer, resulting in an increase in total capacitance of the porous body, along with a reduction in inner resistance.

The laminate of the porous body may include sinter layers having different density of the layers. In this anodic electrode, the laminate may include high density sinter layers and low-density sinter layers which are laminated in contact with a high density sinter layer.

Furthermore, in the anodic electrode of the present invention, the laminate of the porous body may be formed of sinter layers having a higher specific surface area and sinter layers having a lower specific surface area laminated together.

In the invention, the porous body preferably may have corrugated surfaces for connection with a cathode-connecting electrode to decrease the contact resistance therewith. For this purpose, a laminate of two types of preforms having different thermal shrinkage ratio during sintering may be used for being sintered into sintered layers in the porous body.

A process of fabricating such a laminate may comprise sintering a laminate of a plurality of preforms which are prepared from at least two types of preforms having different properties.

In another process of the present invention, the plurality of preforms may include the first type of preforms and the second type of preforms having preform densities different from each other, and the two types of preforms are laminated and the laminate is sintered, to fabricate the porous body.

In a process of producing such a porous body, at least two types of preforms, which are made from valve metal powders having different specific surface areas of the micropores per unit weight, is laminated in a laminate, and sintered into a porous body.

Particularly, the anodic electrode for electrolytic capacitor of the present invention may be produced by sintering a laminate of two types of preforms made from powders of secondary particles having different physical strengths agglomerated from primary particles of a valve metal.

Further, it is preferable that the preforms are made sufficiently thin in the shape of a plate or sheet, and the porous body is joined with a valve metal substrate, or metal foil, so that the valve metal foil is disposed substantially in parallel to the sinter layers formed of the preforms. Alternatively, the valve metal substrate may be disposed substantially perpendicular to the sinter layers.

Further, in the process, the preforms may include plates or sheets formed of valve metal powder. The plates or sheets may be stacked on the substrate of valve metal foil, the laminate being sintered as a whole. In another process, first the porous body may be formed by sintering the laminate of the preforms, and then the sintered porous body is joined, either in parallel or perpendicularly, with the valve metal substrate.

BRIEF DESCRIPTION OF THE DRAWINGS

The present invention will be described in detail below with reference to the following drawings, as follows:

FIG. 2C is a sectional view showing an anodic electrode for electrolytic capacitor having a porous body according to another embodiment of the present invention;

PREFERRED EMBODIMENT OF THE INVENTION

A basic structure of an anodic electrode for electrolytic capacitor of the invention comprises a porous body of valve metal of laminated sinter layers. The porous body has a great number of micropores in mutual communication. The laminated sinter layers are formed by sintering a laminate of preforms.

The preforms may be formed of a powder of valve metal into a desired shape. As a valve metal, tantalum, titanium, niobium, etc., may be used for the anodic electrode. The powder may include refined particles of the metal having complicated configuration with very large specific surface area on each particle. Tantalum may preferably be referred to as the example of valve metal, and such a metal powder may be supplied from the potassium reduction process using potassium tantalum fluoride material. The preform may be thin and in the shape of a plate or sheet, preferably less than 1 mm thick. The thin preforms may be made by pressing the powder in a press, and maintaining a suitable porous state.

In a process of producing such an anodic electrode, a method of fabricating the porous body comprises: forming porous preforms from powders of valve metal; stacking a plurality of the porous preforms into a laminate; and sintering the preform laminate at a sintering temperature to form a porous body.

Figure 1A:
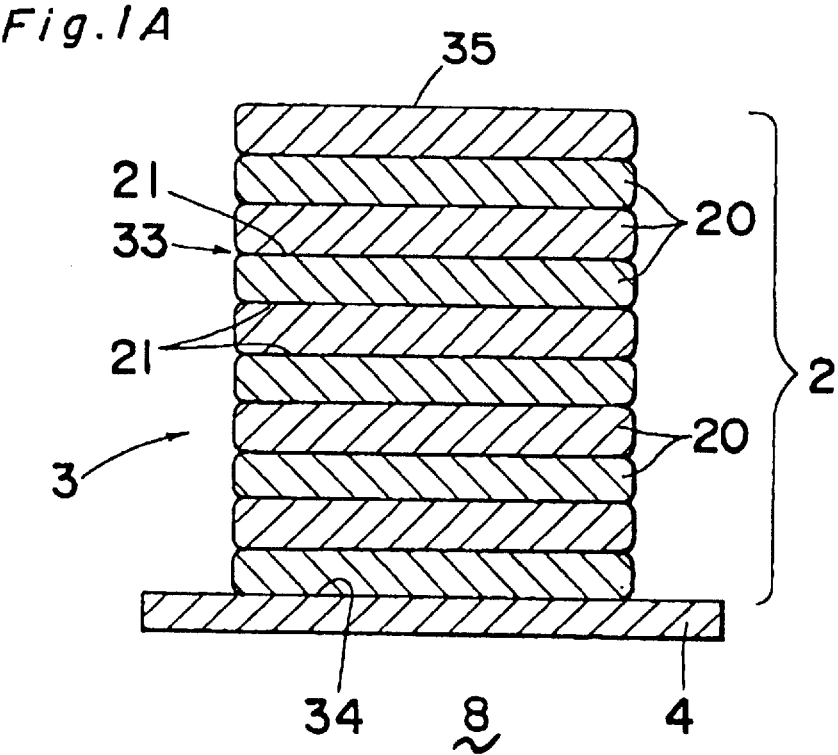
FIG. 1A is a sectional view showing an anodic electrode for electrolytic capacitor according to an embodiment of the present invention.
Figure 1B:
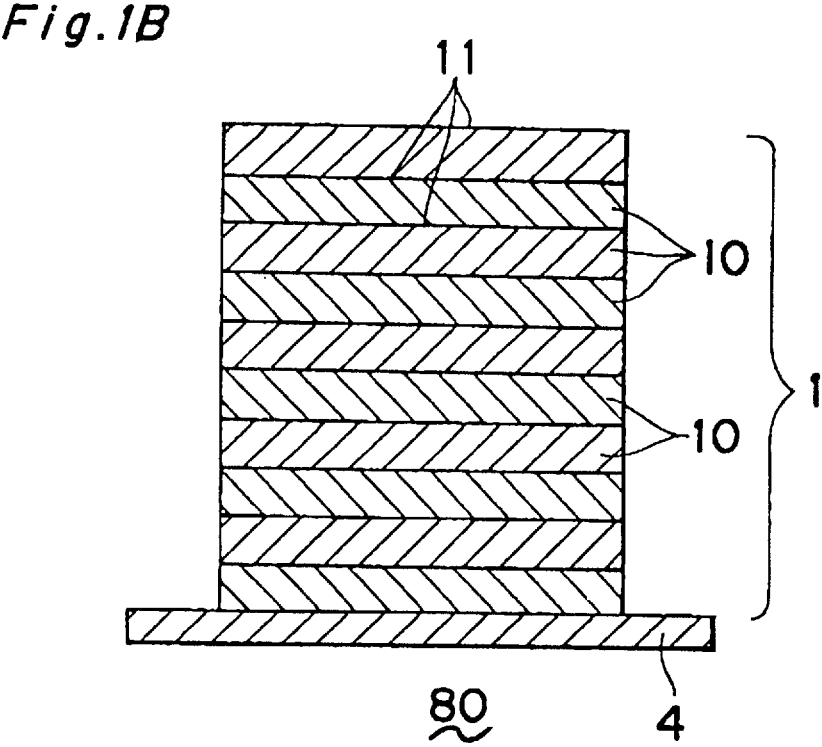
FIG. 1B shows the sectional view of the laminate which is stacked with a plurality of thin preforms according to an embodiment of the present invention.

As an instance, as shown FIG. 1A, the structure of the electrode 8 includes a porous body 2 having micropores and a valve metal substrate 4, which may be foil, joined therewith, wherein the porous body 2 is laminated with a plurality of sinter layers 20 corresponding to preforms 10 stacked as shown in FIG. 1B.

Figure 3:
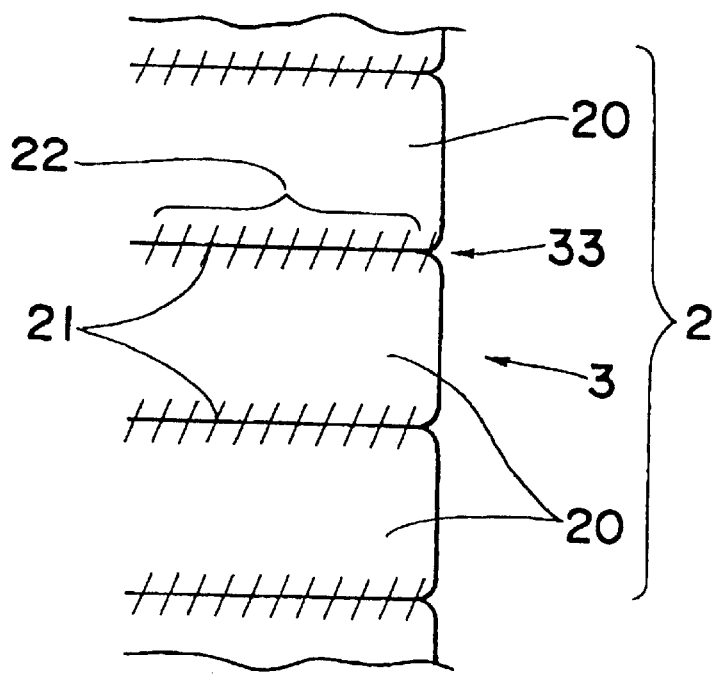
FIG. 3 is a schematically enlarged sectional view showing a porous body sintered of a preform laminate according to an embodiment of the present invention.

The sintered porous body 2, as shown in FIG. 3, has a larger micropore regions 22 being lower in density in the vicinity of a jointed interface 21 sintered at which two of the preforms 20 are joined with each other, as compared to an inner region of each sinter layer 20. The large size micropores in the larger micropore region 22 on and close to the jointed interface region are easily capable of being filled with solid electrolyte sufficiently in the electrolyte filling step, so that the electrolyte can pass through the relatively large size micropores in the larger micropore region 22 close to the jointed interface 21, thereby allowing the smaller micropores in each sinter layer to be filled sufficiently with the electrolyte. The large micropore regions 22 around the interfaces 21 can function to provide the low resistance current passage and the finer micropores in the each sinter layer 20 provide high capacitance due to their large specific surface area filled with the electrolyte. Thus the layered porous body of the electrode of the present invention shows properties of both low inner resistance and high capacitance.

In the present invention, by sintering the laminate of the plurality of preforms 10 as shown in FIG. 1B, thin paralleled grooves 33 may be formed on the external side surfaces 3 of the sintered porous body 2, as shown in FIG. 1A, along lines of the joint interfaces 21 occurring due to laminating surfaces 11 of the preforms 10, depending on such conditions as sintering temperatures, sintering time, the nature of the powder, and preform density. As a result of the expansion of the side surfaces 3 of the porous body 2 which are to be joint areas jointing with a cathode-connecting electrode, the contact area of a cathode-connecting electrode attaching to the side surface 3 is increased, allowing the capacitor to reduce in contact resistance at the cathode-connecting electrode. Thus high-frequency characteristics are improved in addition to lowering inner resistance due to the presence of larger micropore regions.

Figure 2A:
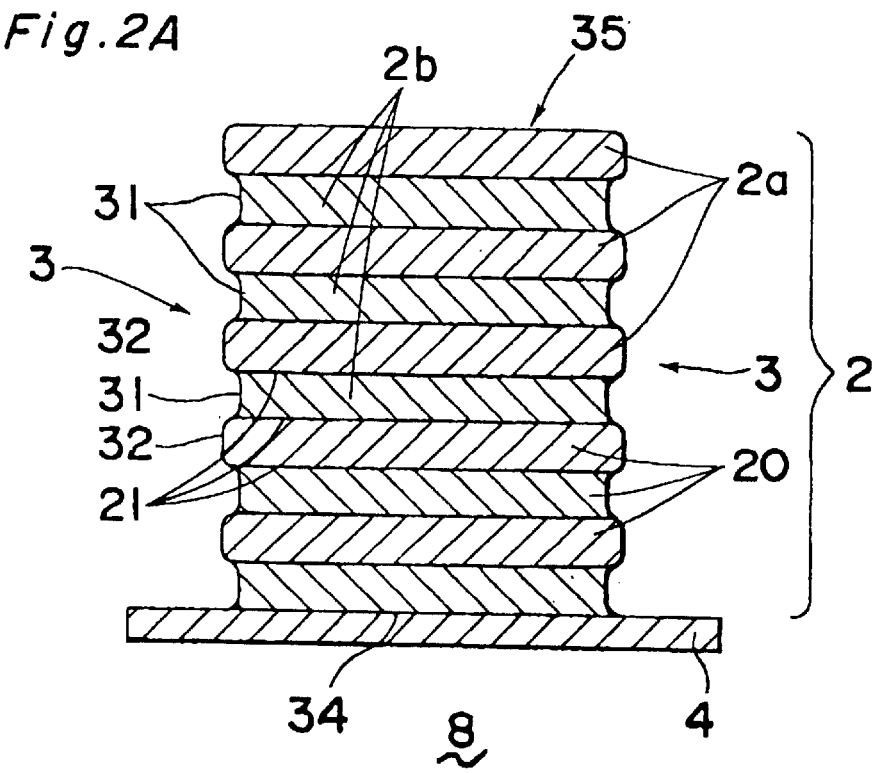
FIG. 2A is a sectional view showing an anodic electrode for electrolytic capacitor having a porous body sintered according to another preferable embodiment of the present invention.
Figure 4:
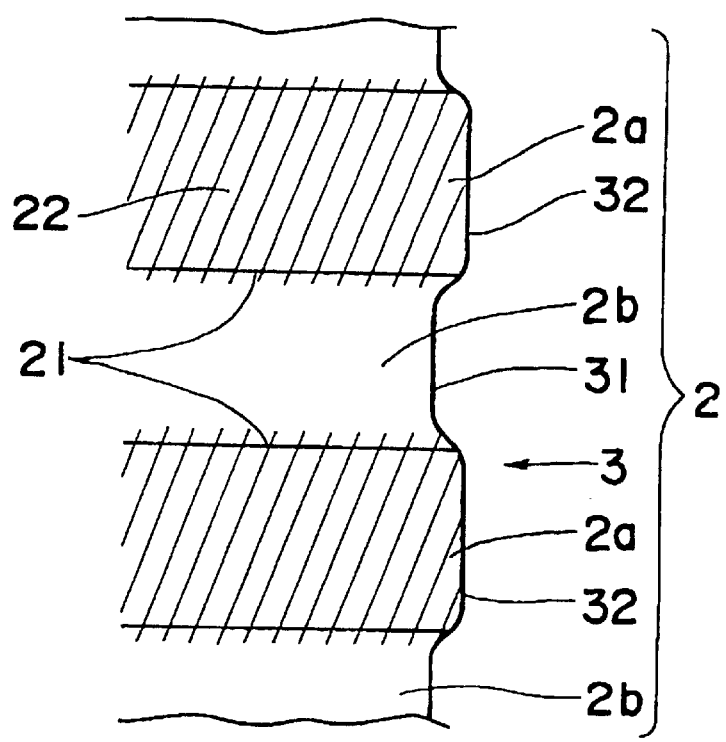
FIG. 4 is a schematically enlarged sectional view showing a porous body sintered of a preform laminate of two types of preforms according to an embodiment of the present invention.

In another embodiment of the invention, it is preferable that two types of the sinter layers having quantitatively different properties may be used to establish the larger micropore regions laminated in the sintered laminate. Such properties may be selected from different micropore sizes in the sinter layers, i.e., the first type of sinter layer 2a may be set to be large micropore-sized sinter layers (enlarging the larger micropore regions as shown in FIG. 4) and the second type of sinter layer 2b to be smaller micropore-sized sinter layers, and the larger micropore-sized sinter layers may be readily impregnated with electrolyte to decrease inner resistance between the side surface 3 of porous body 2 and the smaller micropore-size sinter layers 2a (the second type of the sinter layers 2b) as shown in FIGS. 2A, 2C and 4. The smaller micropore-sized sinter layers have high capacitance density and are sufficiently filled with the electrolyte through the larger pored-sinter layers, then increasing the capacitance due to high specific surface in the smaller micropore-sized sinter layers.

As an example of micropore sizes, the smaller micropore size sinter layers may have 0.05 to 0.3 $\mu$m and the larger micropore size sinter layer may have 0.3 to 1.5 $\mu$m represented by a peak value of pore size distribution in a layer. The pore size is expressed by the peak value of the measured micropore size distribution by the traditional mercury microporosimeter technique and the ratio of the peak values of micropore sizes of the smaller micropore size sinter layer to the larger micropore size sinter layer may preferably be set to be in a range of 1.2 to 5.0.

The laminate of the porous body may be formed of low-density sinter layers as the first type of sinter layer 2a and high-density sinter layers as the second type of sinter layer 2b, wherein the low-density sinter layers function as the larger pore size sinter layer, as mentioned above, which are sufficient filled electrolyte to be used for current passages to decrease inner resistance, and the high-density sinter layers function as the smaller micropore-size sinter layer which increase the capacitance. Further, the high-density sinter layers and the low-density sinter layers are laminated one on another alternately to form the laminate.

The first type and the second type of sinter layer may have 1.1 to 3.0 of a sinter layer density ratio. The high density sinter layers may preferably be in range of 5.5 to 7.5 g/cm$^3$ and the low density sinter layers may be in the range of 2.5 to 5.5 g/cm$^3$, which exhibit larger micropore size in the layers for the low resistance passages.

The porous body made of such a laminate comprising two types of sinter layers may preferably have corrugated surfaces, having linear recesses 31 and/or projections 32 on the side surfaces 3 of the porous body to be attached to a cathode-connecting electrode, as shown in FIGS. 2A and 4.

In an anodic electrode for electrolytic capacitor in the invention, the porous body may be made by sintering the stack of two types of preforms 1a and 1b having different qualities such as densities, i.e., lower density preforms as the first type of preform 1a with micropores of larger pore size, and higher density preforms as the second type of preform 1b with micropores of smaller size. Thus, the micropores in the sinter layers 2a of lower density can be sufficiently filled with the electrolyte.

Also, the sinter layer of lower density (from first type of preform 1a) experiences a smaller amount of shrinkage than the sinter layer of higher density (from second type of preform 1b) after sintering at low sintering temperatures, resulting in corrugation of the external surface, i.e., liner recesses 31 due to the low density-sinter layers (the first type of the sinter layer 2a) and linear projections 32 due to the high density-sinter layers (second type of layers 2b) on the side surface 3 in a direction of the joint interfaces 21 layered in the porous body 2 as shown in FIG. 4. Surface area of the side surfaces 3 of the porous body 2 may be increased 1.2 to 1.6 times as much as the flat area of the side surface without any surface corrugation, thereby to decrease the contact resistance between the side surface and the cathode-connecting electrode.

Part of the sinter layers may have a lower specific surface area of micropores as the first type of sinter layer, functioning as larger pore-sized sinter layers having the electric current passages for reducing the inner resistance. Thus, the second type sinter layers having the higher specific surface area have a function of increasing capacitance. In order to fabricate this anodic electrode, a laminate of at least two types of preforms having different specific surface areas of micropores per unit weight is used with preforms being stacked alternately and sintered. The first type of preform 2a having a smaller specific surface area of the micropores, which have larger particles of valve metal, can be less easily sintered at low sintering temperatures than the second type of preform 2b of larger specific surface area of the micropores as discussed above. Then the thermal shrinkage ratio of the first type of preform to the second type during sintering is smaller accompanied by micropores of larger size, and therefore the first type of preform 2a can be projected as a line on the side surfaces after sintering, resulting in corrugation of the outer surface of the porous body.

Thus, the porous body for the anode electrode may comprise a laminate by laminating two types of the sinter layers which are sintered from two types of preforms of valve metals that have a different thermal shrinkage ratio during sintering the preforms. The two types of preform may be pressed from valve metal particles different in particle size, being stacked alternately on one another, and then sintered to be incorporated.

Figure 5A:
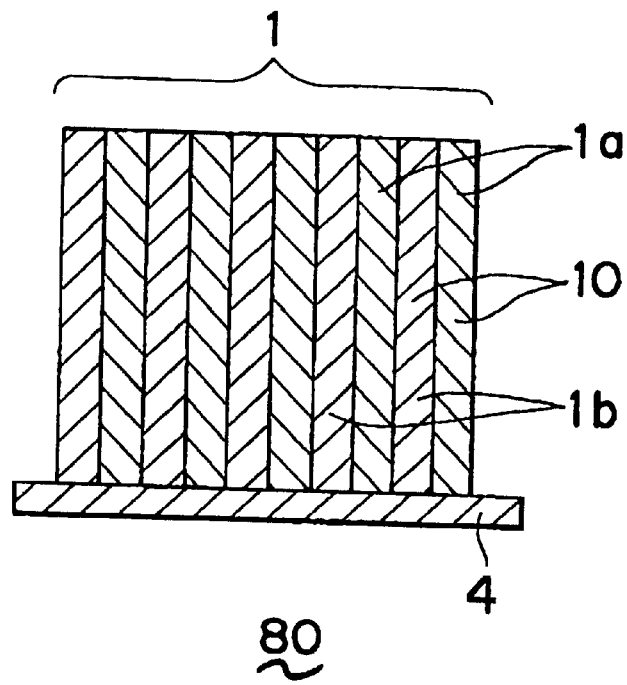
FIG. 5A is a sectional view of a laminate of the thin preform and a metal foil attached to the laminate according to an embodiment of the present invention.
Figure 5B:
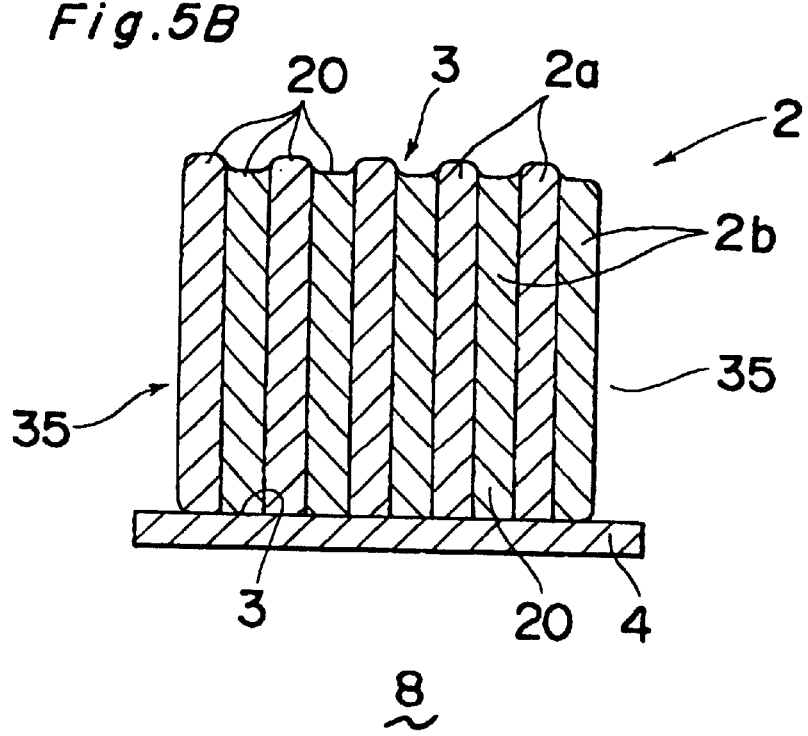
FIG. 5B is a sectional view of an electrode including a porous body sintered according to an embodiment of the present invention.

The laminate sintered from the sinter layers 20 may be joined with the valve metal substrate 4 for an anode electric collector, and the sinter layers 20 may preferably be parallel to the valve metal substrate 4, as shown in FIGS. 1A and 2A and 2C, i.e., the substrate 4 for the anode collector is attached to the stacking surface 34 of the porous body 3. Alternatively, the sinter layers 20 of the laminate may be perpendicular to the valve metal substrate 4 as shown in FIGS. 5A and 5B, i.e., the substrate 4 is attached to one of the side surfaces 3 of the porous body. In these cases, a foil, sheet, or plate of valve metal is used as a valve metal substrate 4. Preferably, the valve metal for the substrate may be tantalum.

In addition, the side surfaces 3 of the porous body 2 comprising two types of the sinter layers may be flat with some narrow grooves as shown in FIG. 2C, similarly to FIG. 1A, without having any such deep corrugation above as shown in FIG. 2A. Such phenomena may occur in the case of substantially equal shrinkage between the first type and second type of sinter layers during the sintering of the corresponding types of preforms in lamination while the grooves are formed along the joint interfaces between the adjacent sinter layers.

Figure 9:
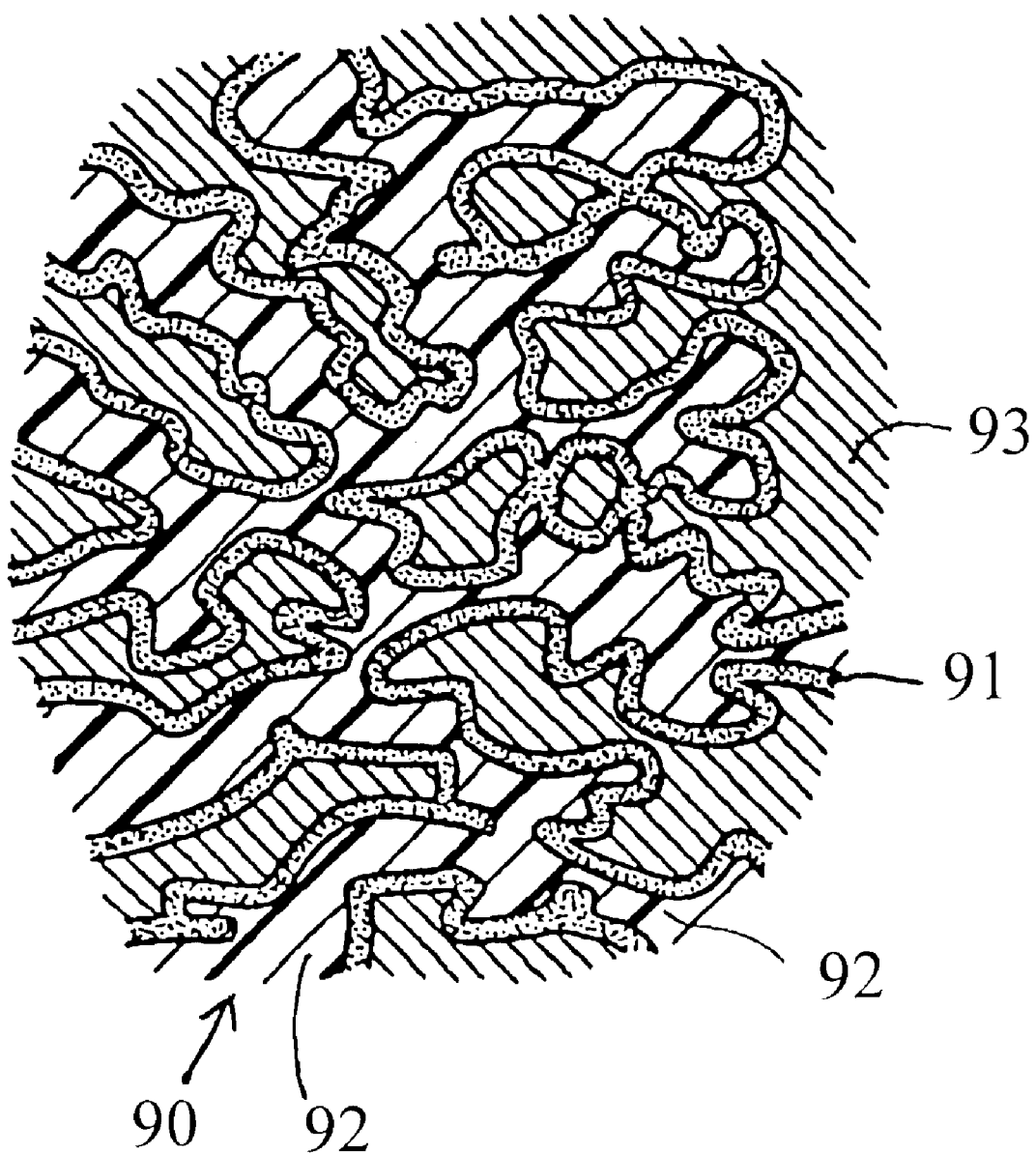
FIG. 9 is a schematic view of an example of a micropore.

A process of producing an anodic electrode for electrolytic capacitor in the present invention, in which the porous body is joined to a valve metal foil, comprises: forming a plurality of porous preforms from powder of valve metal; laminating the plurality of preforms to form a laminate; and sintering the laminate to sinter layers incorporated in the sintered laminate to make the porous body. The resulting porous body is composed of a plurality of sinter layers made by sintering the stacked preforms and has micropores 90 in each sinter layer which is to be formed with a dielectric layer 91 in the micropores that are then filled with an electrolyte 92, see FIG. 9.

In this process, the preforms may preferably be prepared by forming powder of the valve metal to a sheet or plate form. For the powder material, tantalum powder, e.g., a powder having high specific surface area which is made by means of potassium reduction of sodium tantalum fluoride, may be used. Sheets or plates as preforms preferably may be produced by compressing the powder in a press into thin compacts having suitable density and thickness of the preforms, for example, of 1 mm or less, particularly, less than 0.5 mm or, particularly, 0.5 mm to 0.05 mm.

For another kind of preforms a method may be adopted to produce the preforms from a slurried or binderized sheet containing a valve metal powder such as tantalum powder.

Figure 2B:
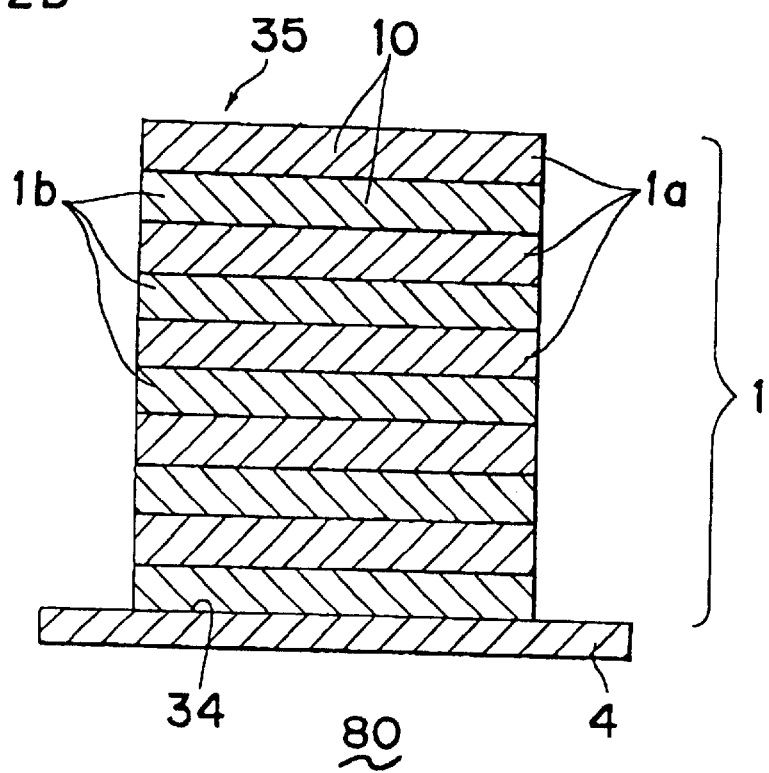
FIG. 2B is the sectional view of the laminate which is stacked with a plurality of two types of thin preforms according to an embodiment of the present invention.

In laminating, the suitable number of preforms are stacked in a laminate to provide a desirable capacitance to a fabricated capacitor. The preforms may be laminated on a substrate of valve metal which may typically be used for an anode electric collector. The multilaminated preforms 10 may be parallel (as shown in FIGS. 1B and 2B) or perpendicular (as shown in FIG. 5A) to the substrate 4 surface. After sintering, the porous body 2 is joined with the valve metal substrate 4.

In sintering, the laminated preforms are fired at sintering temperatures of the valve metal in a vacuum furnace to sinter each preform. Then a porous body is produced comprising sinter layers from the thin preforms. The sintering is accomplished at sintering temperatures suitable for the valve metal, for example, 900 to 1600° C. for tantalum, at which valve metal particles in the preforms are connected with one another leaving a great number of micropores in them, and the preforms are connected with each other into corresponding sinter layers. The sintering temperature may be changed to modify the shrinkage ratio of the preform during sintering, as will be explained.

By the sintering of the preforms, the sintered laminate in the porous body is formed with a smaller micropore-size region within each of the sinter layers and larger micropore-size regions between the two adjacent sinter layers where the sintering action has been slightly insufficient to connect the adjacent preforms with each other during sintering. The large micropore region and the small micropore region are alternatively repeated to be made laminar. As discussed above, in the present invention, the larger micropore-size regions are useful to form electric conductive passages between the smaller micropore-size regions and side surfaces of the porous body.

The porous body produced by this process is provided on the side surfaces with a plurality of linear recesses 31 and/or projections 32 parallel to each other which are formed along a direction of the sinter layers on the surface. The linear recesses may be linear grooves 33 along the opening edges of each of the preforms 10 on the side surface 3 during sintering. Such grooves 33 on the side surfaces 3 of the porous body are useful to increase a contact area of the side surfaces 3, which are to be covered with and in contact with a cathode-connecting electrode 5.

Particularly, in the process, it is desired that the plurality of preforms are composed of at least two types of preforms different quantitatively in properties including density and/or shrinkage, to form large micropore regions more wider, and also to corrugate the side surfaces of the porous body more deeply.

First, the property of preforms of the two types may include a different thermal shrinkage ratio during sintering. In this case, a first type of preform may show a large thermal shrinkage ratio and the second type of preform may have a small thermal shrinkage ratio. Such first and second types of preforms are stacked in contact with each other to form the preform laminate, and thereby the sintered laminate can have side surfaces provided with recesses which have been shrunk relatively deeper corresponding to the first type of preform and with projections which have been shrunk relatively shallower to the second type of the preforms depending on shrinkage difference between adjacent preforms of the two types under consideration during sintering.

Further, the process may utilize the plurality of preforms including low density preforms as a first type of preform and high density preforms as the second type of preform, which, in laminating, are stacked in contact with each other to form the laminate. The densities imparted to preforms can be achieved by controlling the compressing pressures to be added to the powders in forming preforms. The ratio of the high density to the low density in the two types of preforms are set to be in a range of 1.1:1 to 3.0:1. After sintering at relatively low temperatures, low density preforms are changed to low density sinter layers having a larger micropore size, as compared with high density sinter layers having smaller-size sinter layers from the second type of preform. The sintering at low temperatures allows the density ratios of the preforms to be maintained in sinter layers corresponding to each of the two types of preforms.

Thus, the sinter layers in the porous body are to be divided in two parts of high density regions and low density regions in a multilaminar state. The high density sinter layers may preferably be in range of 5.5 to 7.5 g/cm$^3$ and the low density sinter layers may be in the range of 2.5 to 5.5 g/cm$^3$ which the low density sinter layers exhibit larger micropore size in the layers for the low resistance passages.

Figure 6:
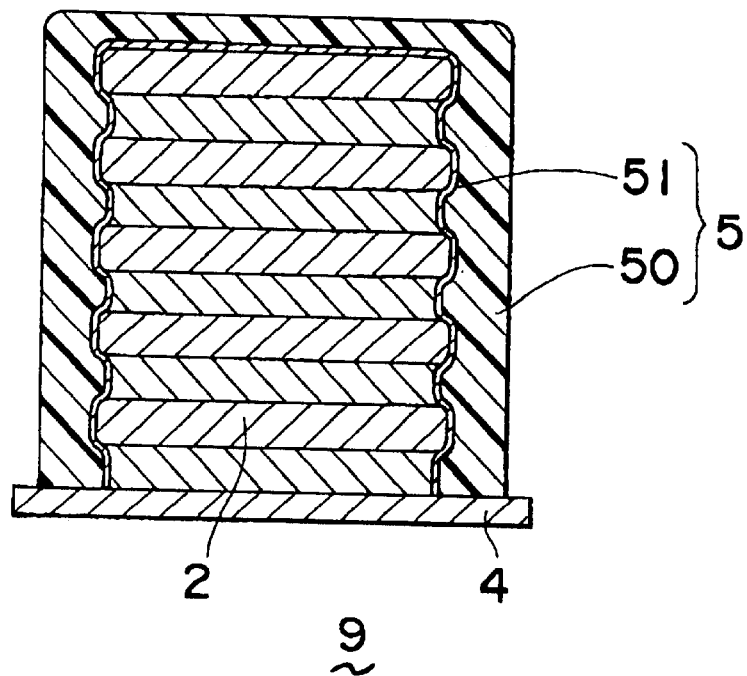
FIG. 6 shows a sectional view of an electrolytic capacitor fabricated from the electrode according to an embodiment of the present invention.
Figure 7:
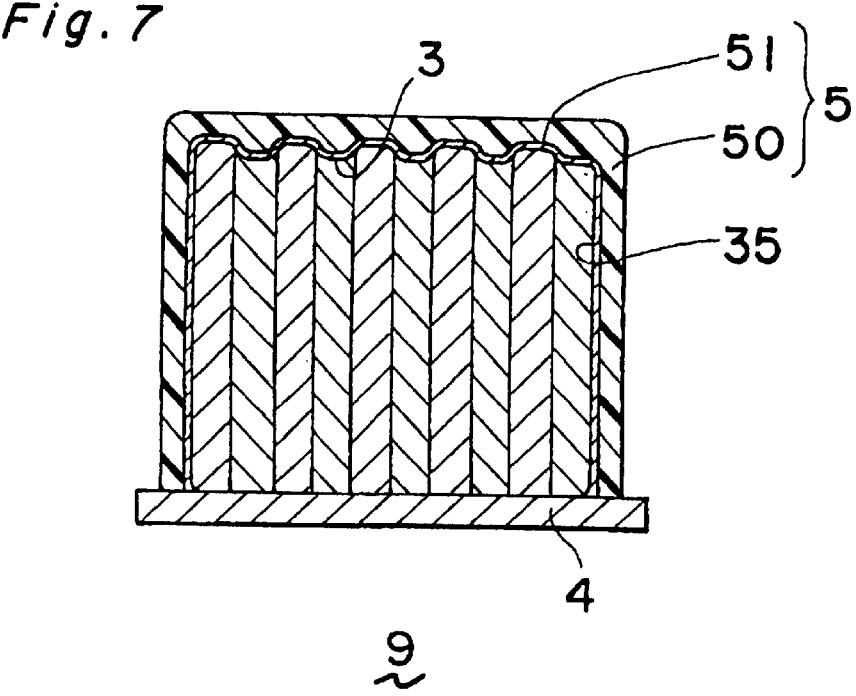
FIG. 7 shows a sectional view of an electrolytic capacitor, similarly to FIG. 6 according to an embodiment of the present invention.
Figure 8:
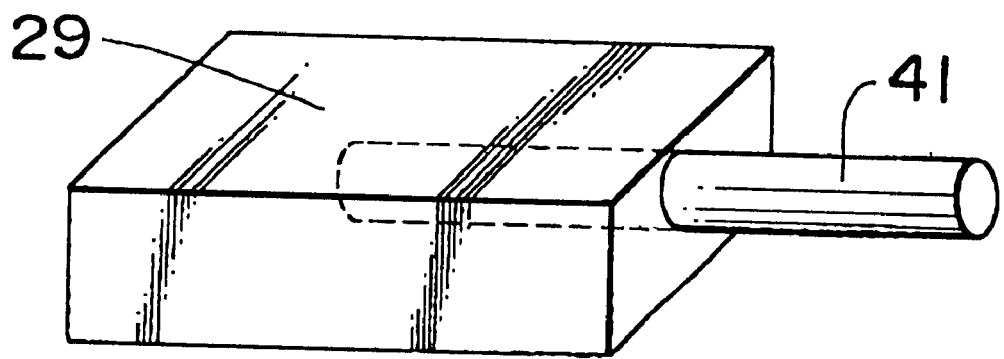
FIG. 8 is a schematic view showing a prior art tantalum pellet for electrolytic capacitor.

As discussed above, the first type of preform 1a having low density are apt to experience a smaller amount of shrinkage than the second type of preform 1b (the sinter layer of higher density) during sintering at low sintering temperatures and results in deep corrugation of the side surfaces, which include liner recesses due to the low density-sinter layers 2a and projections due to the high density-sinter layers 2b on the side surface 3 in a direction of the joint interfaces 21 layered in the porous body 2 as shown in FIG. 4. The deep corrugation can thereby decrease the contact resistance between the side surfaces 3 and the cathode-connecting electrode 5 in contact with each other as shown in FIGS. 6 and 7.

However, it is noted that, when sintering is carried out at a higher sintering temperature, the projections and recesses have an adverse relation with respect to the high density- and low density-sinter layers with same effects as described above. Higher sintering temperatures can promote the sintering of preforms to densify the low density-preforms to ultimate density of solid sintered material. Then, the low density-preforms show a greater amount of sinter shrinkage than the high density preforms.

In another embodiment of the process, a plurality of preforms comprise at least two types of preforms different in specific surface areas of micropores per unit weight, and, in laminating, the first type of preforms having low specific surface area and the preforms having high specific surface are stacked one on another to form the laminate.

In this case, the preforms may be made from two powders different in specific surface areas per unit weight.

A powder of tantalum having low specific surface area of micropores per unit weight and the other powder having high specific surface area are pressed to the first and the second types, respectively, of preforms which are laminated alternatively and sintered to a sintered laminate of a porous body. After sintering, the preforms of low specific surface area are changed into larger micropore-size sinter layers to be used for low electric resistance passages between the smaller micropore-size sinter layers to exhibit high capacitance because of effective utilization of the total high micropore areas existing in the smaller micropore-size sinter layers.

In another process, at least two types of preforms including the first preform and the second preform made from powders of valve metals that have different physical strength of powder, and the first preform and the second preform are stacked one on another to form the laminate.

Particularly, the anodic electrode for electrolytic capacitor of the present invention may be produced by sintering a laminate of two types of preforms made from powders containing the secondary particles having different physical strengths which are agglomerated from primary particles of a valve metal, and the different types of the preforms are laminated one on another alternatively.

When a first type of preform 1a is selected from the powder of secondary particles having higher physical strength, which are coagulated primary particles more strongly by heat treatment, are less capable of being sintered than the powder of lower physical strength of the second type of preform 1b. Then, the thermal shrinkage ratio of the first type of preform 1a is less than that of the second type of preform 1b while being accompanied by micropores of larger size and producing linear projections 32 on the side surfaces in the porous body. Sinter layers 2a having larger micropores in the porous body are more easily filled with electrolyte and improve the efficiency of achieving capacitance. As a result, the equivalent series resistance can be reduced by utilizing the inner regions including larger micropores in the porous body and the region of expanded side surface of the porous body in connection with a cathode-connecting electrode.

The porous body so produced for an electrode for electrolytic capacitance is anodized in an acid solution such as phosphoric acid to form a dielectric layer in the sinter layers of the porous body and the substrate for an anode electric collector. Thereafter, the porous body is impregnated with a solid electrolyte, preferably such as manganese dioxide. In this case, the anodized porous body is inserted in a solution of manganese nitrate in water, and then dried and calcined in an oxidizing atmosphere to dissolve the nitrate into manganese dioxide in the micropores. This operation is repeated several times till the oxide is filled almost completely in the micropores in the sinter layers.

The outside of the porous body filled with electrolyte is covered, as shown in FIGS. 6 and 7, with first a graphite layer 51 applied on the porous body 2 and a silver-containing curable paste 50 applied to the graphite layer 51. The graphite layer 51 and the paste 50 together form a cathode connecting electrode 5. Thereafter, the silver-pasted porous body is housed in a metallic conductive can (not shown) but the anode-electric collector remains exposed outside the can, to obtain a solid electrolytic capacitor 9.

EXAMPLE 1

First, a number of sheet-like preforms are made by pressing fine powder of a valve metal. Then a valve metal foil is ground to make its surface roughened as a substrate 4 for anode collector. The preforms 1 are stacked on the substrate 4 for an anode electric collector to form a laminate 80. Thereafter, the laminate is sintered to form a porous body 2, thereby completing an electrode 8 for electrolytic capacitor shown in FIG. 1.

In this example, the porous body 2 is constructed by multilaminated thin sinter layers 1 and the sinter layers 20 are formed by sintering the stacked preforms above, with one preform that is sintered corresponding to one sinter layer 1.

In the sintered porous body 2, the regions of large micropores, in FIGS. 1B and 3, are formed in the vicinity of ajoint interface 21 between sinter layers 20 in contact with each other, and are lower in density than the inner regions of the sinter layers 20 and are also larger in micropore size than inside the sinter layers 20.

Moreover, since edges of each preform 10 are rounded during sintering, as shown in FIGS. 1A and 3, narrow grooves 33 are formed in the vicinity of the joint interface 21 between two sinter layers on the side surface 3 of the porous body 2.

A portion interposed between adjacent sinter layers 20 of the porous body 2 made by sintering the laminate formed from a number of preforms 10, namely the large micropore regions 22 at the jointed interfaces 21, have a low density, and the micropores formed in this region have larger sizes. In the large micropore regions of lower density, substantial shrinkage occurs after sintering and the shrinkage causes narrow grooves 33 to be formed in the vicinity of the joint interface 21 on the side face of the porous body 2.

In Example 1, electrolytic capacitors are fabricated as follows. A refined powder of metal tantalum in a grade of 70000 $\mu$F·V/g as a measure of specific surface area was pressed into preforms each measuring 1.0 mm×3.0 mm in size and 0.44 mm in thickness, with ten preforms stacked on a tantalum foil as a substrate for anode electric collector and sintered at 1350° C. in high vacuum, thereby making an electrode 8 for electrolytic capacitor.

Then, the electrode 8 for electrolytic capacitor was anodized in a phosphoric acid solution maintained at a temperature of about 85° C. with a voltage of 20V applied to form a dielectric layer in the sinter layers 20 of the porous body, and manganese dioxide was formed as an electrolyte in the porous body by repeated treatments of dipping it in manganese nitrate solution and calcining to manganese oxide. Further, after providing a cathode-connecting electrode 5 consisting of a graphite layer 51 and a conductive resin paste 50 rich in silver particles, an external anode lead and an external cathode lead were connected to the electrode which is molded in a molding resin to complete an electrolytic capacitor. Theoretical capacitance of the electrolytic capacitor made in this process is to be 350 $\mu$F.

As a comparative example, a porous body was made by pressing metal tantalum fine powder into a single large preform measuring 1.0 mm×3.0 mm in size and 4.4 mm in thickness, which was joined with a valve metal foil made to have a roughened surface by grinding. This assembly was sintered to make an anodic electrode for electrolytic capacitor. This capacitor electrode will be hereinafter called the comparative electrode. The density of the porous body of the comparative electrode could be substantially equal to that of the porous body of the anodic electrode for electrolytic capacitor.

A comparative electrolytic capacitor also was to have theoretical capacitance of 350 $\mu$F, which was made from the comparative electrode in a process similar to the process of making the capacitor in a similar manner of Example 1.

Capacitance was measured at a voltage at a frequency of 120 Hz applied thereto and at a voltage at a frequency of 100 kHz applied thereto. Equivalent series resistance at a voltage of resonance frequency of 1 MHz applied was measured. The measured results are set forth in Table 1.

TABLE 1

| | Capacitance at 120 Hz ($\mu$F) | Capacitance at 100 kHz ($\mu$F) | Equivalent series resistance (m$\Omega$) |
|---|---|---|---|
| Present invention | 322 | 110 | 45 |
| Comparative Example | 305 | 83 | 50 |

As is clear from Table 1, the measured capacitance of the capacitor in this example is near the theoretical capacitance and higher than that of the comparative capacitor. The capacitor of this example shows less decrease in capacitance caused by high frequency voltage, as compared with the comparative capacitor. It is also seen that the capacitor of Example 1 has low equivalent series resistance, having an excellent high-frequency characteristic and is capable of carrying large ripple current.

The reason that the capacitor of this example has such a large capacitance is that larger pores are formed in the jointed interface region in the porous body 2 with the dielectric layer formed in the large pores so that almost all the pores existing in the porous body are capable of being used as a capacitor.

Also, it is seen that the capacitor in the example has an excellent high-frequency characteristic because the grooves are formed on the surface of the porous body leading to an increase in the surface area of the porous body, thereby reducing the equivalent series resistance of the capacitor of the first embodiment.

EXAMPLE 2

In an example of this embodiment, a refined tantalum powder having 70000 $\mu$F·V/g of measure of specific surface area per unit weight was used to be pressed into pieces of preforms in a sheet shape of each measuring 1.0 mm×3.0 mm×0.44 mm. Five pieces of a first type of preform with density of 6.0 mg/cm$^3$ and five pieces of the second type of preform 2b with density of 4.4 mg/cm$^3$ were prepared by altering the pressing draft. The first type and second type of preform 2a and 2b were stacked alternately one on another to form a ten-layered laminate on the tantalum foil as a substrate for anode electric collector. This laminate was sintered to make a porous body, thus completing an anodic electrode for electrolytic capacitor of this example. The conditions of sintering the laminate were set to be similar to those of the first embodiment above.

An electrolytic capacitor having theoretical capacitance of 370 $\mu$F is made from the anodic electrode for electrolytic capacitor 9 similarly to the first example.

For the comparative example, tantalum fine powder is pressed into a small block measuring 1.0 mm×3.0 mm in size and 4.4 mm in thickness with density of 5.2 mg/cm$^3$, which is sintered to make a porous body. This porous body is joined with a tantalum foil for anode electric collector. Sintering conditions are similar to sintering the porous body of this example.

A comparative electrolytic capacitor is also to have theoretical capacitance of 370 μF and is fabricated from the above comparative electrode in similar manner to the process of making the capacitor of this example.

Table 2 shows resulting capacitance data of the capacitors of this example and the comparative which are evaluated under a voltage at frequencies of 120 Hz and 100 kHz applied thereto. Equivalent series resistance under a voltage of resonance frequency 1 MHz is also evaluated.

TABLE 2

|  | Capacitance at 120 Hz (μF) | Capacitance at 100 kHz (μF) | Equivalent series resistance (mΩ) |
| --- | --- | --- | --- |
| Present invention | 341 | 139 | 40 |
| Comparative Example | 318 | 86 | 55 |

As is clear from Table 2, the capacitor in the second example is larger in capacitance than the comparative capacitor and is near the theoretical capacitance. Also the capacitor of this example experiences less decrease in the capacitance that is caused by a voltage of high frequency applied, than the comparative capacitor. It is also shown that the capacitor of this example has the equivalent series resistance, thus exhibiting a high-frequency characteristic with capability of carrying large ripple current.

The reason for the capacitor of the second example having a large capacitance is that the micropores of larger size are formed in the second sinter layer of the porous body of the anodic electrode for electrolytic capacitor. As the large pores are filled with the electrolyte, the pores provide capacitance efficiently.

Also the capacitor of the second example has lower equivalent series resistance because the side face of the first sinter layer becomes concave resulting in an increase in the surface area of the porous body. The reduction in the equivalent series resistance means an improvement of high-frequency characteristic of the capacitor, in the second example. Adhesive strength of the porous body to the cathode-connecting electrode can also be increased due to the recesses and projections on the side surfaces, thereby improving the reliability of delamination resistance between them.

The anodic electrodes for electrolytic capacitor in these examples are produced from the porous body made by forming the laminate on a metal foil substrate and then sintering the laminate, but the present invention is not limited to this procedure. Alternatively, the anodic electrode for electrolytic capacitor may be produced by first sintering the laminate to form the porous body, then joining the porous body to the metal foil for electrode.

In the examples described above, preforms of different densities are formed from the same tantalum powder, and are sintered to form the porous body having local differences in the density, the pore size and the thermal shrinkage ratio, but the present invention is not limited to the above conditions. For example, the porous body may also be produced by sintering a laminate formed from a plurality of preforms that are different in the density or the thermal shrinkage ratio which are made by regulating the degree of coagulation of the primary particles or the secondary particles of the tantalum powder and controlling the tantalum powder particle size or bulk density thereof. The preforms may also be made from powders of two or more types of valve metal having different densities or thermal shrinkage ratios. Green sheets may also be used as the preforms.

As described above, the anodic electrode for electrolytic capacitor of the present invention has the porous body formed by stacking a plurality of preforms to make the laminate and sintering the laminate. The porous body has regions of low density and regions of high density, with micropores of larger size being formed in the regions of low density. When the electrolytic capacitor is made using this electrode, since the larger pores can be sufficiently filled with the electrolyte, an electrolytic capacitor of large capacitance can be obtained. Since the region of higher density has a high thermal shrinkage ratio, grooves are formed on the porous body. Since this increases the surface area of the porous body, connecting resistance with the cathode-connecting electrode is reduced and equivalent series resistance of the electrolytic capacitor decreases, thus improving the high-frequency characteristic.

What is claimed is:

1. An anodic electrode for an electrolytic capacitor, said anodic electrode comprising:
    a porous body including
       side surfaces,
       a laminate of a plurality of sinter layers including micropores sintered from valve metal particles, said micropores having a dielectric layer formed therein and being filled with electrolyte,
       smaller micropore-size regions, and
       larger micropore-size regions forming electrically conductive passages between said smaller micropore-size regions and said side surfaces.

2. The anodic electrode according to claim 1, wherein said larger micropore-size regions are vicinities of interfaces between said sinter layers in said laminate, and said smaller micropore-size regions are inside said sinter layers.

3. The anodic electrode according to claim 1, wherein said plurality of sinter layers comprise first and second types of sinter layers that are different quantitatively in properties than one another.

4. The anodic electrode according to claim 3, wherein said first type of sinter layer is a larger micropore-sized sinter layer and said second type of sinter layer is a smaller micropore-sized sinter layer, and said laminate includes sinter layers of the first and second type laminated in contact with each other.

5. The anodic electrode according to claim 4, wherein in said laminate, said first type of sinter layer comprises low-density sinter layers and said second type of sinter layer comprises high-density sinter layers.

6. The anodic electrode according to claim 4, wherein in said laminate, said first type of sinter layer has a low specific surface area and said second type of sinter layer has a low specific surface area.

7. The anodic electrode according to claim 1, wherein said valve metal particles are tantalum particles.

8. The anodic electrode according to claim 1, further comprising:
    a valve metal substrate, wherein said porous body is joined with said valve metal substrate for anode electric collection and said sinter layers are parallel to said valve metal substrate.

9. The anodic electrode according to claim 1, further comprising:

a valve metal substrate, wherein said porous body is joined with said valve metal substrate for anode electric collection and said sinter layers are perpendicular to said valve metal substrate.

10. The anodic electrode according to claim 1, wherein said porous body is filled with electrolyte impregnated in said micropores.

11. The anodic electrode according to claim 1, wherein said electrolyte is manganese dioxide.

12. The anodic electrode according to claim 1, further comprising:
a cathode-connecting electrode, comprising silver-containing paste and a graphite layer;
wherein said cathode-connecting electrode covers said porous body such that said graphite layer of said cathode-connecting electrode is between said porous body and said silver-containing paste of said cathode-connecting electrode.

13. The anodic electrode according to claim 1, wherein said porous body comprises a plurality of parallel linear recesses and/or parallel linear projections formed along a direction of said sinter layers for increasing a contact area of said side surfaces with a cathode-connecting electrode.

14. The anodic electrode according to claim 13, wherein said parallel linear recesses and/or said parallel linear projections are narrow grooves formed along interfaces between said sinter layers.

15. The anodic electrode according to claim 14, wherein said valve metal particles are tantalum particles.

16. The anodic electrode according to claim 13, wherein said plurality of sinter layers comprise first and second types of sinter layers that are different quantitatively in properties than one another.

17. The anodic electrode according to claim 16, wherein said first type of sinter layer is a larger micropore-sized sinter layer and said second type of sinter layer is a smaller micropore-sized sinter layer, and said laminate includes sinter layers of the first and second type laminated in contact with each other.

18. The anodic electrode according to claim 17, wherein in said laminate, said first type of sinter layer comprises low-density sinter layers and said second type or sinter layer comprises high-density sinter layers.

19. The anodic electrode according to claim 18, wherein said valve metal particles are tantalum particles.

20. The anodic electrode according to claim 17, wherein in said laminate, said first type of sinter layer has a low specific surface area and said second type of sinter layer has a low specific surface area.

21. The anodic electrode according to claim 20, wherein said valve metal particles are tantalum particles.

22. The anodic electrode according to claim 17, wherein said valve metal particles are tantalum particles.

23. The anodic electrode according to claim 16, wherein said valve metal particles are tantalum particles.

24. The anodic electrode according to claim 13, wherein said plurality of sinter layers comprise first and second types of sinter layers that are different quantitatively in properties than one another, and said plurality of parallel linear recesses and/or plurality of parallel linear projections are formed repeatedly along each of said first and second types of sinter layers on said side surface of said porous body.

25. The anodic electrode according to claim 24, wherein said valve metal particles are tantalum particles.

26. The anodic electrode according to claim 13, wherein said valve metal particles are tantalum particles.

27. The anodic electrode according to claim 13, further comprising:
a valve metal substrate, wherein said porous body is joined with said valve metal substrate for anode electric collection and said sinter layers are parallel to said valve metal substrate.

28. The anodic electrode according to claim 13, further comprising:
a valve metal substrate, wherein said porous body is joined with said valve metal substrate for anode electric collection and said sinter layers are perpendicular to said valve metal substrate.

29. The anodic electrode according to claim 13, wherein said porous body is filled with electrolyte impregnated in said micropores.

30. The anodic electrode according to claim 13, wherein said electrolyte is manganese dioxide.

31. The anodic electrode according to claim 13, further comprising:
a cathode-connecting electrode, comprising silver-containing paste and a graphite layer;
wherein said cathode-connecting electrode covers said porous body such that said graphite layer of said cathode-connecting electrode is between said porous body and said silver-containing paste of said cathode-connecting electrode.

* * * * *